(12) United States Patent
Gong et al.

(10) Patent No.: US 11,416,075 B1
(45) Date of Patent: Aug. 16, 2022

(54) WEARABLE DEVICE AND USER INPUT SYSTEM FOR COMPUTING DEVICES AND ARTIFICIAL REALITY ENVIRONMENTS

(71) Applicant: Facebook Technologies, LLC, Menlo Park, CA (US)

(72) Inventors: Jun Gong, Redmond, WA (US); Aakar Gupta, Redmond, WA (US); Hrvoje Benko, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 167 days.

(21) Appl. No.: 16/829,209

(22) Filed: Mar. 25, 2020

Related U.S. Application Data

(60) Provisional application No. 62/981,245, filed on Feb. 25, 2020, provisional application No. 62/939,559, filed on Nov. 22, 2019.

(51) Int. Cl.
*G06F 3/01* (2006.01)
*G01S 5/22* (2006.01)

(52) U.S. Cl.
CPC .............. *G06F 3/014* (2013.01); *G01S 5/22* (2013.01); *G06F 3/017* (2013.01)

(58) Field of Classification Search
CPC .............. G06F 3/014; G06F 3/017; G01S 5/22
See application file for complete search history.

(56) References Cited

U.S. PATENT DOCUMENTS

| | | | | |
|---|---|---|---|---|
| 2002/0135570 A1* | 9/2002 | Iisaka | ............... | G06F 3/041 345/177 |
| 2010/0289740 A1* | 11/2010 | Kim | ............... | G06F 3/046 345/157 |
| 2012/0218228 A1* | 8/2012 | Payne | ............... | G06F 3/0423 345/175 |
| 2015/0258431 A1* | 9/2015 | Stafford | ............... | G06V 40/11 463/31 |
| 2017/0102771 A1* | 4/2017 | Lei | ............... | G06F 3/0436 |
| 2018/0074593 A1* | 3/2018 | Dibbur | ............... | G06F 3/014 |
| 2018/0129356 A1* | 5/2018 | Leigh | ............... | G01S 7/539 |

OTHER PUBLICATIONS

Non-Final Office Action received for U.S. Appl. No. 16/829,933 dated Jan. 29, 2021, 16 pages.
Final Office Action received for U.S. Appl. No. 16/829,933 dated Jun. 10, 2021, 16 pages.
Non-Final Office Action received for U.S. Appl. No. 16/829,933 dated Sep. 23, 2021, 18 pages.

* cited by examiner

*Primary Examiner* — Towfiq Elahi

(74) *Attorney, Agent, or Firm* — FisherBroyles, LLP

(57) ABSTRACT

A wearable device equipped with sensors or transducers capable of detecting a vibration propagating through two different mediums. In some embodiments, the two mediums are air and a surface contacted by a user. In such an embodiment, the sensors or transducers include a microphone and an accelerometer. In some embodiments, the device may perform some or all of the signal processing and/or logic used to determine that a contact occurred and the location of the contact using a processor programmed with a set of computer-executable instructions. In some embodiments, the device may transmit data or signals to a processor located in a different device, such as a mobile phone or artificial reality headset, for signal processing and/or the execution of logic.

20 Claims, 8 Drawing Sheets

US 11,416,075 B1

WEARABLE DEVICE AND USER INPUT SYSTEM FOR COMPUTING DEVICES AND ARTIFICIAL REALITY ENVIRONMENTS

CROSS REFERENCE TO RELATED APPLICATIONS

This application claims the benefit of U.S. Provisional Application No. 62/939,559, filed Nov. 22, 2019, the disclosure of which is incorporated, in its entirety, by this reference. This application also claims the benefit of U.S. Provisional Application No. 62/981,245, filed Feb. 25, 2020, the disclosure of which is incorporated, in its entirety, by this reference.

BRIEF DESCRIPTION OF THE DRAWINGS

The accompanying figures illustrate a number of exemplary embodiments and are a part of the specification. Together with the following description, these figures and description demonstrate and explain various principles of the present disclosure.

Figure 1:
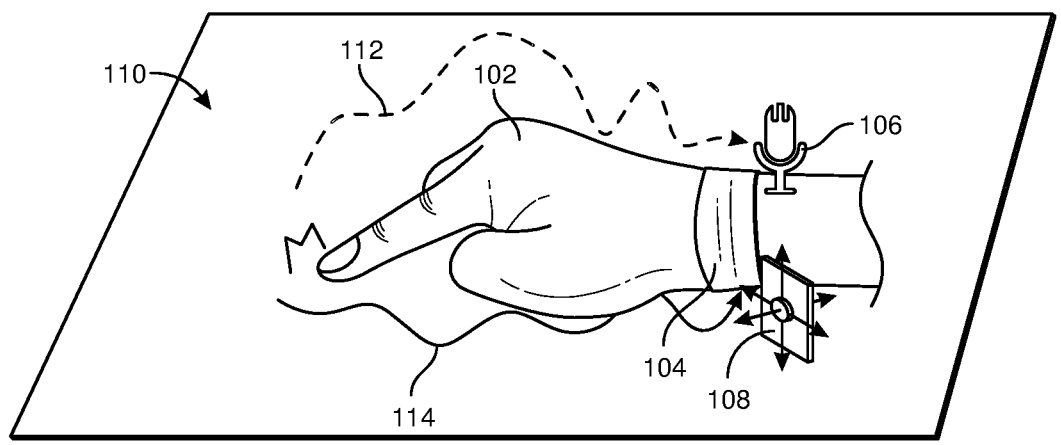
FIG. 1 is a diagram of an exemplary user input device in the form of a wristband that may be part of the user interface system described herein.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Artificial reality (referring to a form of reality that has been adjusted in some manner before presentation to a user) is becoming a more and more popular way for users to interact with physical objects, imaginary and real environments, games, and with each other. A part of such interactions is the selection of a user interface element by a user, where conventionally, the selection is indicated by a user operating a controller. However, a disadvantage of relying on input from a controller when a user is experiencing an artificial reality environment is that it does not represent how users naturally interact with the real world or a virtual environment. As a result, use of a controller to indicate selection of a user interface element may be disruptive to a user's experience and in some cases is counter-intuitive. Artificial reality, as used herein, may include, for example, a virtual reality, an augmented reality, a mixed reality, a hybrid reality, or some combination and/or derivative thereof.

In various artificial reality experiences, it may be more natural for a user to contact a surface to indicate a choice or select an option. The contact may be in the form of a touch, tap, or similar action. In some cases, a user may desire to indicate a decision, configure a system, select a function, or select a user interface (UI) element by contacting a specific place on an object, on a surface, or even on their own skin or clothing. In some situations, both the act of the contact and its location are of importance to deciding what action the user desires or to determining how the artificial reality environment should respond to the user.

Because of the interest in providing users with a more natural and intuitive experience in an artificial reality environment, other ways of detecting a user's selection of a user interface element have been investigated and developed. These typically involve determining if a user has contacted a surface.

Some approaches to detecting that a user contacted a surface may include using an audio transducer to detect the sound generated by the contact or using a surface vibration transducer to detect the surface vibrations that occur when a user contacts the surface. However, both approaches may have disadvantages. The acoustic transducer approach may be susceptible to noise from environmental sources of noise and signal-to-noise discrimination problems. The surface vibration transducer approach may be affected by a user's coarse hand movements (e.g., a waving of their hand). These movements can introduce errors, and as a result, generate a false positive. In addition, a relatively light contact may not be detected due to the small amount of sound and/or vibration it generates.

Another form of detecting that a user has contacted a surface involves hand-tracking, where a system or device attempts to determine that a user's hand has touched a surface or a specific region. Conventionally this is performed using optical imaging and image processing. However, this approach has the disadvantage that there is often uncertainty with regards to whether and/or when a user actually contacted a surface, whether a user instead was pointing at a surface, whether a user was actually touching a nearby surface, etc.

In many situations, detecting that a contact occurred, as well as determining the location of the contact, are important to deciding what action the user desires and determining how an artificial reality environment responds to the user. For contact localization or contact location determination, some approaches include instrumenting a surface with an accelerometer at each of four corners or instrumenting a device (e.g., a laptop or mobile phone) resting on a surface with a similar set of sensors. However, such approaches may limit the surfaces upon which contact can be detected and may also be a source of errors when vibrations that are not caused by a user's contact are detected.

In contrast to the approaches discussed above, embodiments of the present disclosure may provide a more natural alternative or supplement to using a controller to navigate an artificial reality environment, or to otherwise interact with a computing system. Embodiments may also provide increased precision in determining that a contact occurred and in the localization of the contact compared to conventional approaches. Embodiments may enable any suitable surface (e.g., a table, clothing, an object, etc.) to function as an input device or surface for an artificial reality application. Some embodiments may also determine a location where the user is contacting an un-instrumented surface when the user's hand is resting on the surface.

The present disclosure is generally directed to user interfaces, and more specifically, to improving how user input is provided to a system or device. As will be explained in greater detail below, embodiments of the present disclosure may detect data generated by a user's contact with a surface and use that data to determine both that a contact event occurred and the location of the contact. The location of the contact may then be used by another device, such as an artificial reality (e.g., augmented or virtual reality) headset, to determine the user's desired selection of a user interface element, to activate a function or perform a task in the artificial reality environment, or perform another function typically initiated in response to an input to a user interface.

In one example, the present disclosure describes a user input device and system that overcomes the disadvantages of conventional controller-based user input devices, particularly for users engaged in experiencing an artificial reality environment. An exemplary user input system may include a wearable device having a set of sensors positioned to detect a user's contact with a surface, an electronic data storage element containing a set of computer-executable instructions, and an electronic processor programmed with the set of computer-executable instructions. When executed, the set of instructions may cause the system to detect a vibration propagating through a first medium as a result of the user's contact with the surface, detect a vibration propagating through a second medium as a result of the user's contact with the surface, and determine a location where the user contacted the surface based on a time difference between detecting the vibration propagating through the first medium and detecting the vibration propagating through the second medium.

The disclosure also describes a method, where the method includes detecting a vibration propagating through a first medium as a result of a user's contact with a surface, detecting a vibration propagating through a second medium as a result of the user's contact with the surface, determining a location where the user contacted the surface based on a time difference between detecting the vibration propagating through the first medium and detecting the vibration propagating through the second medium and using the determined location to determine the user's intended interaction with a user interface.

Embodiments of the present disclosure may provide improved methods and systems for enabling a user to indicate a desired action or intended interaction with a user interface as part of using an artificial reality application. Embodiments provide these improvements and accompany advantages in ways that are more consistent with a user's experience and desired interactions with an artificial reality environment. Embodiments also represent improvements to computing devices and systems by providing users with a more natural and effective way to indicate a desired action or intended interaction. This may improve the usefulness and portability of computing systems and devices and may be more convenient than using a controller-based input for some applications.

In one example, the described user input device may enable a user's contact with a surface to be determined accurately without disrupting their other activities, and the location of the contact may be used to indicate a user's selection of a specific user interface element. This capability may be particularly important when a user is experiencing an artificial reality environment, where using a hand-held controller may be disruptive to how the user would normally interact with the environment. Embodiments may overcome disadvantages and limitations of conventional approaches by detecting two indications of a user's contact with a surface and using a difference in arrival time of the two indications to determine a location of the contact. This approach may be both more accurate and less susceptible to background noise and other sources of error than conventional approaches.

The advantages and benefits of the embodiments described herein may include improving the operation of applications and computing devices by enabling a user selection to be determined without a hand-held controller. This enables a user to select or indicate a choice of a user interface element in a way that is both untethered from a controller and more natural for use with certain applications, such as those used to generate and interact with an artificial reality environment.

Features of any of the embodiments mentioned herein may be used in combination with one another in accordance with the general principles described herein. These embodiments, features, and advantages will be more fully understood upon reading the detailed description in conjunction with the accompanying drawings and claims.

In some embodiments, the advantages and benefits described herein are obtained by an input device worn by a user and equipped with a set of one or more sensors or transducers capable of detecting a vibration propagating through two different mediums. In some embodiments, the two mediums are air and the surface contacted by a user. In such embodiments, the sensors or transducers may include an audio transducer and an accelerometer. In some embodiments, the device may perform some or all of the signal processing and/or logic used to determine that a contact occurred and the location of the contact using a processor programmed with a set of computer-executable instructions. In some embodiments, the device may transmit data or signals to a processor located in a different device, such as a mobile phone or artificial reality headset, for signal processing and/or the execution of logic.

One embodiment of the user interface system may include an input device for artificial reality device users in the form of a wearable device. In one example, the device may be in the form of a wristband. In another example, the device may be in the form of a ring, badge, bracelet, or patch worn on a user's finger, hand, wrist, or arm. As will be described, for best operation, the placement of the input device on the user is preferably such that it can detect vibrations that are generated by a user's contact with a surface that travel along the surface, through the air, and/or through the user to the input device.

In some embodiments, the user input device may include a layer, surface, or foundation upon which are embedded or attached one or more sensors or transducers. In some embodiments, the device may be shaped to enable it to be worn by a user as a wristband, bracelet, ring, patch, or badge, among other shapes.

In some embodiments, the terms "set of sensors" or "set of transducers" may refer to one or more elements, devices, detectors, collectors, components, or the like that operate to receive a vibration or wave generated by an event, and in response generate an electrical signal that may be subjected to further processing.

In some embodiments, the terms "audio transducer" or "acoustics transducer" may refer to an element or component that operates to convert a propagating sound vibration into an electrical signal. Examples of such elements or components include, but are not limited to microphones, voice coils, resonators, speakers, piezoelectric sensors, and pickups.

In some embodiments, the terms "surface transducer" or "surface vibration transducer" may refer to an element or component that operates to convert a propagating surface vibration into an electrical signal. Examples of such elements or components include, but are not limited to accelerometers (e.g., piezoelectric accelerometers), motion detectors, etc.

In some embodiments, the term "electronic data storage element" may refer to an element or component for the storage of digital data. Examples of such elements or components include, but are not limited to magnetic-storage media (e.g., hard disk drives, tape drives, and floppy disks), optical-storage media (e.g., Compact Disks (CDs), Digital Video Disks (DVDs), and BLU-RAY disks), and electronic-storage media (e.g., solid-state drives and flash media).

In some embodiments, the term "electronic processor" may refer to an element or component for the execution of a set of computer-executable instructions. Examples of such elements or components include, but are not limited to a processor, controller, micro-controller, CPU, GPU, or FPGA.

In some embodiments, the term "user input" may refer to a user's action, the selection or indication of a user input element, or to the input of text or data into a user interface. Such user input or inputs may be provided to an artificial reality environment, a device, or a system to control or alter the operation of the environment, device, or system.

In some embodiments, the phrase "desired action of the user" may refer to a selection, decision, choice, activation, or identification of a user interface element (such as a button, label, icon, region, etc.) or to the input of text or data into a user interface by a user wearing the user input device.

In some embodiments, the phrase "user's intended interaction with a user interface" may refer to a user's selection, indication, or identification of a user interface element. The phrase may also refer to a user's activation or initiation of a process or function resulting from a selection, indication, or identification of a user interface element. The phrase may also refer to a user's input of text or data into a user interface.

One embodiment of the user input device described herein is a wearable device that includes a set of sensors or transducers comprising two acoustic transducers (e.g., in one embodiment, microphones) and two surface vibration transducers (in one embodiment, accelerometers). In this embodiment, the microphones are used to capture the sound generated by a user contacting a surface, and the accelerometers are used to capture the vibrations propagating through or along the surface to the input device (in some cases, because the user's hand is resting on the surface). As will be described in greater detail, the time delay in arrival (TDOA) between the sound and the surface vibrations (and hence the time difference between the signals generated by the two types of sensors or transducers) may be used in a triangulation process to determine the location of the contact, and from that a user's intended interaction with a user interface, such as the selection of a user interface element, input of data or text, or other intended action. Further, the detection of both the sound and surface vibration associated with a contact provides confirmation that a contact occurred and increases the accuracy in detecting the contact.

As background to explain the operation of embodiments of the disclosed user input system and device, note that when a user's finger contacts a surface, the force applied to the surface may cause a deformation. As the force is removed from the contact point, the surface may retract due to its elasticity, which may generate vibrations propagating outward from the point of contact. The vibrations that propagate through or along the surface may be referred to as a "surface wave". The propagation speed of a surface wave may depend on the surface medium. In solid materials, such as wood, a surface wave may propagate at approximately 600 meters per second. The generated vibrations may also propagate through the air (and are perceived as sound), which may be referred to as a "sound wave" or "acoustic wave." The speed of a "sound wave" may be relatively low due to the properties of compression and rarefaction of air. In an exemplary environment (e.g., 20° C. at sea level), the speed of a sound wave may be approximately 343 meters per second.

As indicated, the two types of waves or vibrations generated by a user's contact with a surface may propagate through different mediums and at different velocities. Embodiments utilize this situation to more effectively detect and localize a user's contact with a surface without use of a conventional controller.

The use of two types of sensors or transducers may be beneficial for both detection and localization of a user's contact with a surface. In some embodiments, contact is determined to have occurred only if both types of vibrations (waves) are detected. In some embodiments, the logic or decision process performed as a result of the execution of a set of computer-executable instructions determines if the signals generated by the two types of sensors or transducers occur within a specific time interval. This time interval may correspond to the expected arrival time for the two types of vibrations or waves arising from the same contact event. This logic may help to reduce or prevent false detections (false positives) that might otherwise result if the signal received from only one of the two types of sensors or transducers was used to indicate a contact. For example, it might be difficult for a microphone alone to work satisfactorily in a noisy environment. Similarly, when a user is waving their hand, a false positive might be introduced if the system considered only the signal obtained from an accelerometer.

The following will provide, with reference to FIGS. 1-9, detailed descriptions of the disclosed user interface system and device, along with its operation and use with a computing system or artificial reality headset. These figures, alone or in combination, provide illustrations of an example operational environment and the structure and operation of one or more embodiments of the user input system described herein. The figures provide examples of how an embodiment may be used as part of an artificial reality environment or application, as well as a more general computing system.

FIG. 1 is a diagram of an exemplary user input device that may be part of the user interface system described herein. As described herein, an embodiment may include a set of sensors or transducers, where the "set" may include one or more such sensors or transducers. For example, although the example embodiment of FIG. 1 illustrates two separate sensors or transducers (an acoustic transducer and a surface vibration transducer), an embodiment could instead utilize a single transducer that performs detection of both an acoustic wave and a surface vibration wave. In such a case, the "set" of sensors would be a single multi-function sensor.

In the embodiment of FIG. 1, the user input device is illustrated as a wristband 104 worn by a user 102, although other forms of wearable devices may also be used. In one embodiment, wristband 104 includes two accelerometers 108 and two microphones 106 as sensors or transducers for detecting vibrations resulting from a user's contact with a surface. In one example, the accelerometers are positioned on the bottom of the wristband so that a user may rest their hand on a surface, and vibrations propagating along the surface may be detected by the accelerometers.

Figure 3:
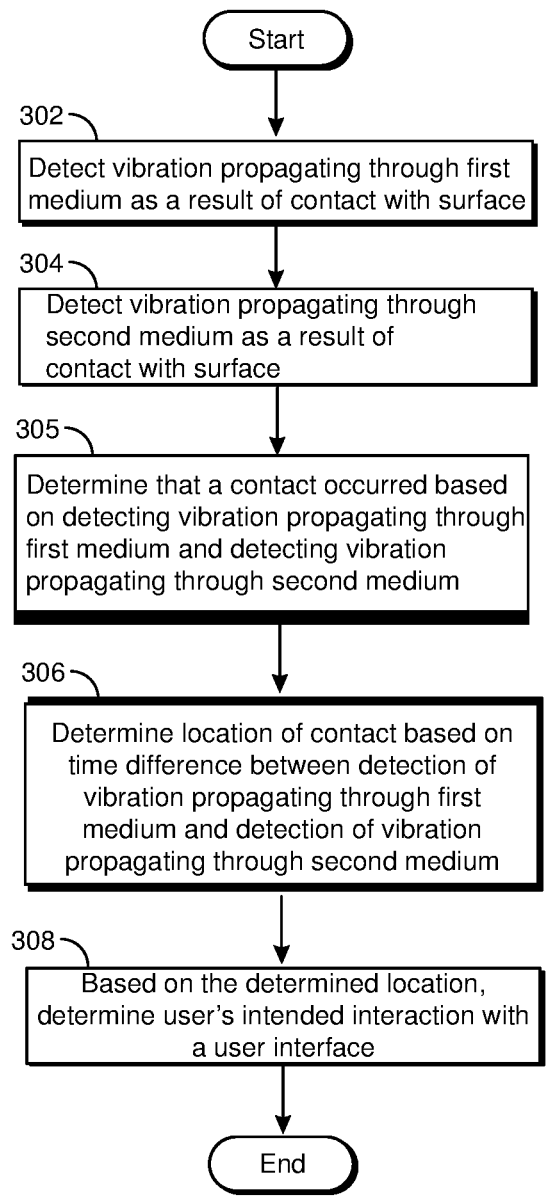
FIG. 3 is a flowchart or flow diagram illustrating an example of the operation of the wearable device and the computer-implemented processing of the detected vibrations to determine the location of a user's contact with a surface for a user wearing the wristband embodiment of FIG. 1.

The microphones are used to detect the audible sound from a contact, while the accelerometers are used to detect vibrations propagating along or through the surface 110 upon which the user's hand is resting. FIG. 3 is a flowchart or flow diagram illustrating an example of the operation of the wearable device and the computer-implemented processing of the detected vibrations to determine the location of a user's contact with a surface for a user wearing the wristband embodiment of FIG. 1.

As shown in FIG. 1, a user (represented by a hand 102) wears a user input device in the form of a wristband 104. Device 104 may include one or more acoustic or audio sensors or transducers (e.g., microphones) 106 and one or more surface vibration sensors or transducers (e.g., accelerometers) 108. In one embodiment, device 104 may include a base (not shown separately) that may be wrapped around a person's wrist and in some examples fastened to remain in place on their wrist. In some embodiments, the base may be flexible or able to be shaped around the person's wrist. In a typical use, the user contacts a surface 110 with their finger to indicate a choice, select an option, or activate a desired function. Surface 110 may be, for example, a table, an item of clothing worn by the user, a book, a door, a window, etc.

The user's contact with a surface may generate two types of vibrations or waves. The first may be an audio or sound wave 112 and the second may be a surface wave 114. Audio wave 112 may propagate through the air and may be received and/or detected by audio sensor or transducer (e.g., a microphone) 106. Surface wave 114 may propagate along or through the surface 110 material and may be received and/or detected by surface vibration sensor or transducer (e.g., an accelerometer) 108.

Both the acoustic vibration and surface vibration arising from the contact may be detected by sensors or transducers that generate corresponding signals. Thus, both sources of signals may be considered when determining if a contact occurred. As a result, the described approach may be more robust and potentially more accurate than conventional approaches. This is particularly so when dealing with potential sources of noise (e.g., environmental sound/coarse hand movements) that might otherwise generate a false positive if using a conventional approach.

In one example, the detection of both a signal generated by an audio sensor and a signal generated by a surface vibration sensor are used to provide confirmation that a contact occurred. Further, in some embodiments, the detection of both signals within a specific time window, which can be determined based on the difference in travel time for each type of vibration or wave from the point of contact to the respective sensors, may provide confirmation that both signals originated from the same event.

In addition to contact detection, embodiments may also be used to determine the location at which a user contacted a surface. For performing contact localization, one embodiment may use the time difference of arrival (TDOA) between a vibration or wave detected at each type of sensor or transducer. Another embodiment may use the difference in arrival time of a vibration or wave detected at each of a pair of the same type of sensor or transducer. These approaches to determining the location of a contact may be based on a "triangulation" process. Triangulation may refer to determining the location of a signal source by measuring and processing signals that are generated by the same event at the same time but that are received at different times. Since the surface vibration wave and the acoustic wave may propagate at different speeds, one embodiment takes advantage of this property to provide and/or improve location resolution.

Triangulation may be used to locate a source by determining the time difference of arrival (TDOA) between the signals generated by the respective sensors or transducers. In another example, a method based on measuring the phase difference of arrival (PDOA) of the two signals may also (or instead) be used. Using a phase difference of arrival technique may provide information regarding the propagation characteristics of a surface material. In some embodiments, that information may be used to identify the material, and as a result, determine a user's point of contact and desired action or intended interaction with a user interface.

The position of a contact point relative to a sensor or sensors can also impact the accuracy with which the location of the contact point can be determined. If a contact point occurs at a location equidistant between two of the same type of sensors or transducers, then the time of arrival of the vibration wave detected by each may be the same. If the contact is closer to one sensor in the pair of sensors than to the other, then the contact point can be inferred to lie somewhere along a hyperbolic curve. Further, by increasing the number of pairs of sensors or transducers, the contact location can be determined more accurately. Based on these observations, some embodiments use the time difference of arrival (TDOA) of a detected wave at each of a pair of the same type of sensor or transducer (i.e., both microphones or both accelerometers) to interpolate the contact location. The location may then be used to infer the user's intended interaction with a user interface.

One challenge may be that in some arrangements of the sensors or transducers, the distance between each pair of the same type of sensors or transducers may be relatively small (e.g., 4 cm, 3 cm, 2 cm, etc.) due to the wristband form factor. Also, because of a user's hand size, the targeted sensing area (the location of the contact point) may be relatively close to the sensors (e.g., within 10 cm, 15 cm, 30 cm, etc.). This situation may make it difficult to resolve vibration waves that originated from a contact that occurred at close, but different locations. For example, in some instances, the vibrations or waves occurring because of a contact at a first location may be separated in time by microseconds (e.g., ~30 us) from those occurring because of a contact at a second location. To address this concern, in some embodiments, a relatively high sampling rate data acquisition system (e.g., 1 MHz, 1.1 MHz, 1.2 MHz, etc.) may be used.

In some embodiments, a process to calculate the difference in the time of arrival between the vibrations or waves received at the accelerometers and the vibrations or waves received at the microphones may be implemented. Since the propagation speeds for vibrational (surface) waves and sound waves may be different, the measured time difference between the received waves may be increased by considering the signals generated by detection of a wave at the two different types of sensors or transducers. As will be described, this approach may increase the accuracy of the contact localization.

Figure 4A:
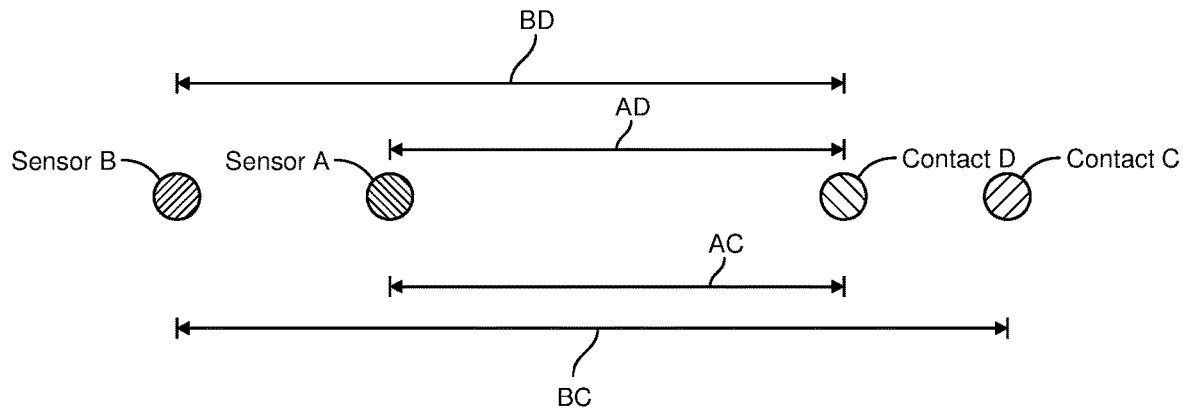
FIG. 4A is a diagram illustrating how considering the difference in arrival times of a vibration propagating through two different mediums and detected by two different types of sensors or transducers can improve the resolution and localization of a user's closely spaced contacts with a surface.

To demonstrate this property and understand why this approach can be beneficial, consider the simple example illustrated in FIG. 4A, which is a diagram illustrating how considering the difference in arrival times of a vibration propagating through two different mediums and detected by two different types of sensors or transducers can improve the resolution and localization of a user's closely spaced contacts with a surface.

The example shown in FIG. 4A represents a situation in which resolving the location of two distinct contacts (identified as Contact C and Contact D in the figure) is improved by considering the difference in arrival time of propagating waves at two distinct types of sensors (identified as Sensor A and Sensor B in the figure). With regards to the figure, assume there are two contacts (C, D) or events occurring in alignment with the two sensors (A, B). The vibrations or waves detected by Sensor A and Sensor B may propagate with respective velocities $V_A$ and $V_B$. Given this configuration, the difference in time of arrival (or time-difference-of-arrival, TDOA) between the waves detected at Sensor A and Sensor B when a contact occurs at location C ($TDOA_C$) may be:

$$TDOA_C = \frac{BC}{V_B} - \frac{AC}{V_A}$$

where BC represents the distance between Sensor B and Contact C and AC represents the distance between Sensor A and Contact C. Similarly, the difference in time of arrival between waves detected at Sensor A and Sensor B when a contact occurs at location D ($TDOA_D$) may be:

$$TDOA_D = \frac{BD}{V_B} - \frac{AD}{V_A}$$

In order to provide better resolution between different contacts and improved localization accuracy, it is desirable to maximize the difference between these two TDOAs. This corresponds to maximizing the value ($|TDOA_C - TDOA_D|$).

Note that if Sensor A and Sensor B are of the same type (i.e., both accelerometers or both microphones), then the propagation velocity for the waves they detect, $V_A$ and $V_B$, would be the same. In this case (and recalling that from the figure, BC=BD+CD, and AC=AD+CD), the difference between the two TDOA values may be zero.

However, if Sensor A is a microphone and Sensor B is an accelerometer, then there may be a situation where $V_A \sim = \frac{1}{2}$ $V_B$. In this case, the difference between the two TDOAs may be (again recalling that from the figure, BC=BD+CD, and AC=AD+CD):

$$|TDOA_C - TDOA_D| = \left(\frac{2BC}{V_A} - \frac{AC}{V_A}\right) - \left(\frac{2BD}{V_A} - \frac{AD}{V_A}\right) = \frac{CD}{V_A}$$

From this simplified example, it is apparent that the time difference between the detected vibrations or waves from distinct contact events can be increased by calculating the TDOA between sensors or transducers that detect waves having different propagation velocities (in this example, an accelerometer and a microphone). This improves the ability to resolve distinct contact events.

Figure 2:
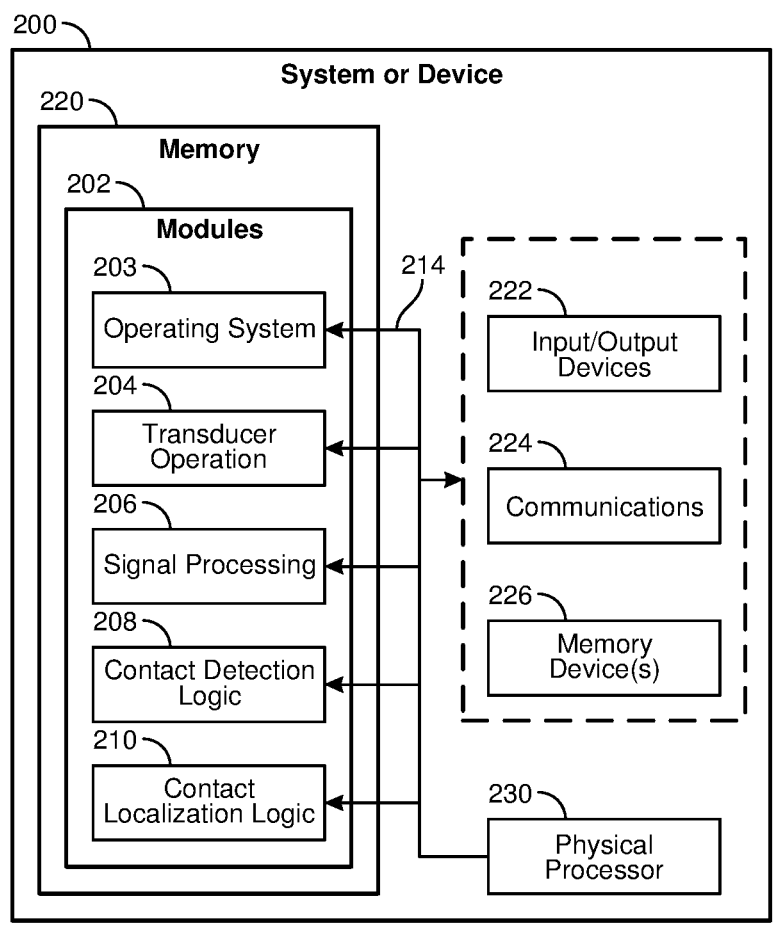
FIG. 2 is a block diagram of an exemplary system for implementing an embodiment of the user interface system described herein.

FIG. 2 is a block diagram of an exemplary system for implementing an embodiment of the user interface system described herein. As shown, system or device 200 may include a set of modules 202, with each module containing instructions that, when executed by an electronic processor, may implement a function or operation described herein. Some or all of the elements of system or device 200 may be present in a wristband, bracelet, ring, badge, patch, headset, mobile phone or other device capable of computing or data processing operations. For example, one or more of the modules illustrated may contain instructions executed by a processor that is part of a wristband. Similarly, one or more of the modules illustrated may contain instructions executed by a processor that is part of a headset or mobile device.

Modules 202 may each contain a set of computer-executable instructions, where when the set of instructions is executed by a suitable electronic processor (such as that indicated in the figure by "Physical Processor(s) 230"), system or device 200 operates to perform a specific process, operation, function or method. Modules 202 may be stored in a memory 220, which typically includes an operating system module 203 that contains instructions used (among other functions) to access and control the execution of the instructions contained in other modules. The modules 202 in memory 220 may be accessed for purposes of transferring data and executing instructions by use of a "bus" or communications line 214, which may also serve to permit processor(s) 230 to communicate with the modules for purposes of accessing and executing a set of instructions. Bus or communications line 214 may also permits processor(s) 230 to interact with other elements of system 200, such as input or output devices 222, communications elements 224 for exchanging data and information with devices external to system or device 200, and additional memory devices 226.

As shown in FIG. 2, modules 202 may contain one or more sets of instructions for performing the methods described herein and with reference to the flow chart of FIG. 3. These modules may include those illustrated but may also include a greater number or fewer number than those illustrated. For example, Transducer Operation Module 204 may contain instructions that, when executed, perform a process to detect a vibration wave or waves received by one or more of the sensors or transducers that are part of a wristband or other wearable device. Similarly, Signal Processing Module 206 may contain instructions that when executed perform a process to perform signal processing operations (such as calculating a time difference of arrival or phase difference of arrival, performing a triangulation calculation, etc.) on the signals generated by the sensors or transducers in order to provide data used by Contact Detection Logic Module 208 to determine if a contact occurred and/or by Contact Localization Logic Module 210 to determine a location of a contact that occurred.

FIG. 3 is a flowchart or flow diagram illustrating an example of the operation of the wearable device and the computer-implemented processing of the detected vibrations to determine the location of a user's contact with a surface for a user wearing the wristband embodiment of FIG. 1. Note that the same or an equivalent process may be used for a user wearing a different form of the input device, such as a bracelet, ring, patch, or badge. The steps shown in FIG. 3 may be performed by any suitable computer-executable code and/or computing system, including the system(s) and modules illustrated in FIG. 2. In one example, each of the steps shown in FIG. 3 may represent an algorithm whose structure includes and/or is represented by multiple sub-steps, examples of which will be provided in greater detail below.

As shown, in one example, a user wearing the device of FIG. 1 contacts a surface, for example by tapping their finger or otherwise touching the surface (step 302). In this example, the user's hand or wrist is resting on the surface so that the accelerometer or other form of surface vibration sensor is in contact with the surface. The user's contact may generate two types of vibrations: an audio or acoustic vibration that propagates through the air and may be detected by a first transducer, for example a microphone or other type of audio transducer (step 302), and a surface vibration that propagates on (or in) the surface being contacted by the user and that may be detected by a second transducer, for example an accelerometer or other type of surface vibration transducer (step 304).

Based on the detection of one or both types of waves as a result of the corresponding signals generated by the respective transducers, computer-executed logic may determine that a contact with the surface occurred. Note that in some embodiments, the logic may rely on detection of one of the types of received vibrations to determine that a contact occurred, since the signals generated by both types of transducers were presumably in response to the vibrations created by the user's finger contacting the surface. This may be sufficient in some environments, but as mentioned, this approach is also prone to error.

To improve the accuracy of detecting a contact, in some embodiments, the executed logic may use the receipt of signals from both types of transducers to determine that a contact occurred (step 305). This is an optional step that can be used to confirm that a contact occurred prior to further processing to determine the location of the contact. In still other embodiments, the receipt of signals from both types of transducers within a specific time period or time window may be used. The time period or window may be calculated by considering the respective travel times for the surface and audio vibrations from the location of a contact to the appropriate transducer. Note that this processing step may be optional in some circumstances.

The executed logic may use further signal processing to determine the location of the contact on the surface. The localization processing may involve considering the time difference between the arrival of the audio wave at each of two audio transducers. If it is assumed that the same event generated the received audio waves and the baseline distance between the two microphones is known, then the angular position of the source of the audio waves can be determined. The contact location may also be determined by considering the time difference between the arrival of the vibration wave at each of two surface vibration transducers.

In some examples, the angular position determined in this way may be augmented by data or images obtained from a camera, hand-tracking, or other sensor to better determine the location of the contact point on a surface.

Further, the location or position of the contact may also be determined by considering the time difference between arrival of the respective waves at each type of transducer, a benefit of which is discussed with reference to FIG. 4A. In this example embodiment, the computer-executed logic performs the triangulation calculation based on a time difference between receiving a signal generated by the first transducer (in this example, an audio transducer) and a signal generated by the second transducer (in this example, a surface vibration transducer), as illustrated at step 306 in FIG. 3. Thus, the embodiment described with reference to FIG. 1 and FIG. 3 may be used to determine that a contact occurred and to process the received signals to determine the location of the contact. The location of the contact on the surface may then be used to determine the user's intended interaction with a user interface, as illustrated at step 308 of FIG. 3. As mentioned, the user's intended interaction may include one or more of input of text or data, selection of a user interface element, or activation of a function or process.

As mentioned, an aspect of this approach that can contribute to the successful sensing and localization of a user's contact with a surface is use of a relatively high sampling rate (e.g., 1 MHz, 1.1 MHz, 1.2 MHz, etc.). By using such a sampling rate, the approach can detect and make use of the small-time differences between arrival of the received waves at the transducers (e.g., several microseconds), which is at least partially the result of the small spacing between the sensors on some embodiments of the input device.

In an example embodiment, a contact-detection device may include two high-sensitivity piezoelectric accelerometers incorporating built-in microelectronics and two micro-electromechanical systems (MEMS) microphones mounted on a board with an associated built-in amplifier to provide a stronger signal and an improved signal-to-noise ratio. The two accelerometers may be connected to a signal conditioner to provide a better form of the signal for the later processing stages, such as by voltage or current limiting and/or anti-aliasing filtering.

A consideration in the implementation of the input device may be the placement of the sensors or transducers. As noted, if a contact point occurs equidistant between two of the same type of sensors or transducers, then the sensors or transducers may detect the wave at the same time. This suggests that for purposes of discriminating between detected waves and more accurately determining the location of a contact, the arrangement of the sensors or transducers may be designed in a manner that minimizes the number of possible equidistant contact point scenarios.

Further, in some embodiments, the signal-to-noise ratio (SNR) of the accelerometer may be greater than that of the microphone when tapping on a surface. In such situations, the microphones may be placed in front of the accelerometers. In view of the foregoing, the sensors may be arranged on the wearable device or wristband with each of the accelerometers and the microphones placed at the corners of a square with the following distribution:

Accelerometer #1 in the lower left corner of the square;
Accelerometer #2 in the upper left corner of the square;
Microphone #1 in the lower right corner of the square; and
Microphone #2 in the upper right corner of the square, where the axis between the two accelerometers or two microphones may be defined as the x-axis (corresponding to the wrist deviation, i.e., the radial and ulnar deviation) and the axis between a microphone and an accelerometer may be defined as the orthogonal y-axis (corresponding to the wrist flexion and extension).

Although the preceding example described two accelerometers and two microphones arranged in a square configuration, other numbers and configurations of the sensors or transducers may be used. For example, instead of two sensors for detecting a vibration propagating through each medium, an embodiment may instead use a greater number of sensors for detecting the vibration propagating through either or both of the two mediums. Further, the arrangement of the sensors is not limited to a square and instead the sensors may be arranged in a rectangle, trapezoid, or other shape. If the relative positions of the sensors are known, then the signal detection and processing described herein may be used to detect and/or localize a user's contact with a surface.

As described, in one example, the device may first detect whether there is a contact on a surface and may then operate to localize the contact. In some embodiments, the localization may be performed or assisted using a trained regression model. One implementation of the device and system described herein may utilize a machine learning toolbox. Once trained, the model outputs may be computed in real-time. A more detailed description of the data processing used in an example of the user input device and system is presented next.

In one embodiment, the sensor/transducer data may first be "sliced" with a sliding window (e.g., of 0.1 seconds, 0.15 seconds, etc.). For each window, the raw data from the four sensors or transducers may be filtered by a bandpass filter with cut-off frequencies of 10-20 Hz and 1000-2000 Hz. The data from the two accelerometers and the two microphones may be summed separately. For the accelerometer data, in order to distinguish a tap from other coarse hand movements, a search may be conducted for a pulse stronger than a preset threshold in a short time period (e.g., 0.01 s). To do this, the data within the window may be divided into 10 slices (or pieces) and the signal power may be calculated for each slice. If the power of one slice is higher than the threshold and the neighboring slices showed a sufficiently lower power, then the accelerometer signal requirements may be satisfied. Next, the microphone signal power in the same time slot (e.g., 0.01 s) may be examined. When the microphone signal power is also higher than the pre-set threshold, it is assumed that a contact occurred.

Once a confirmed contact is detected, a regression model may be used to estimate the contact's 2-dimensional (2D) coordinate. Before extracting features from the raw data, the data processing performed by the system may concatenate the data with the data from the previous window and with the data from the following window to ensure that a complete contact signal was captured.

The possibly unstable (i.e., uncertain or variable) coupling between the accelerometers and the surface being contacted (e.g., due to the user's wrist or hand resting on the surface in order to place the accelerometers in contact with it) can complicate calculating the difference in arrival time for waves detected by the two types of sensors or transducers. Because of this difficulty, it may be preferable to evaluate the performance of several different methods to estimate the difference in arrival time. In one example embodiment, the following four methods may be selected: (1) the time shift when the cross-correlation reaches a maximum; (2) the time difference of first peak value; (3) the time difference of the maximum; and (4) the time difference of the minimum.

In one example of the data processing, an embodiment may use a 24-feature vector (e.g., four estimate methods×six pairs of sensors/transducers) as an input to a machine learning model to train the model for purposes of determining the location of a contact. Each input vector was associated with a label or annotation indicating the correct response desired from the model. In one example, the inventors used a Random Forest algorithm for training the model. Two independent Random Forest regression models (nTrees=200) operating in parallel were used—one for X position and a second for Y position. After training, the model will respond to a new set of input data (in this case a 24-feature vector for a new set of received signals) by generating an output representing the difference in arrival time between the waves received at the two types of sensors or transducers.

One advantage of the approach of combining the signals received from different types and positions of sensors or transducers is that of enhanced reliability. This is because the described approach is largely immune from environmental noises and won't be as likely to be misled by a user's unrelated body or hand movements.

By using an embodiment of the described device and associated signal processing, any suitable surface (e.g., table, object, clothing, etc.) may function as a user input surface for an artificial reality application. For example, a user may tap on a table or on their clothing to confirm or decline messages received from an artificial reality application. This may be particularly helpful to a user who is "immersed" in an artificial or partially artificial environment.

Note that another use case of this embodiment may be for a user to place their non-dominant hand (e.g., the hand wearing the wristband) on a surface and contact the surface using the other hand. As with the other embodiments described, the contact action can be detected and localized.

Other versions or embodiments of the user input system and device described herein may include different positions and alignments of each type or pair of sensors or transducers, either in relation to the same type of sensor or to a different type of sensor. For example, subject to the constraints of the device, maximizing the spacing between the same type of sensors, while minimizing the spacing between different type of sensors, may provide enhanced detection and discrimination capabilities.

In another variation, an optical flow sensor or detector may be combined with other sensors to provide enhanced performance. An optical flow sensor may be a vision sensor or transducer capable of measuring optical flow or visual motion and outputting a measurement based on the sensed optical flow. Such a sensor could be used to detect a hand motion or hand resting location and provide inputs to a process that determines if a contact occurred and/or the location of a contact. Similarly, an optical imaging sensor or device (e.g., camera, video, etc.) could be used to assist in determining the location of a user's contact with a surface. Other forms of hand-tracking technologies may also be used to determine or assist in determining the location of a contact.

As has been described, a certain amount of signal processing and decision logic may be used in embodiments of the system and wearable device. The device or devices in which the signal processing and/or logic is implemented may vary, depending on the embodiment or on the implementation of the embodiment.

Figure 4B:
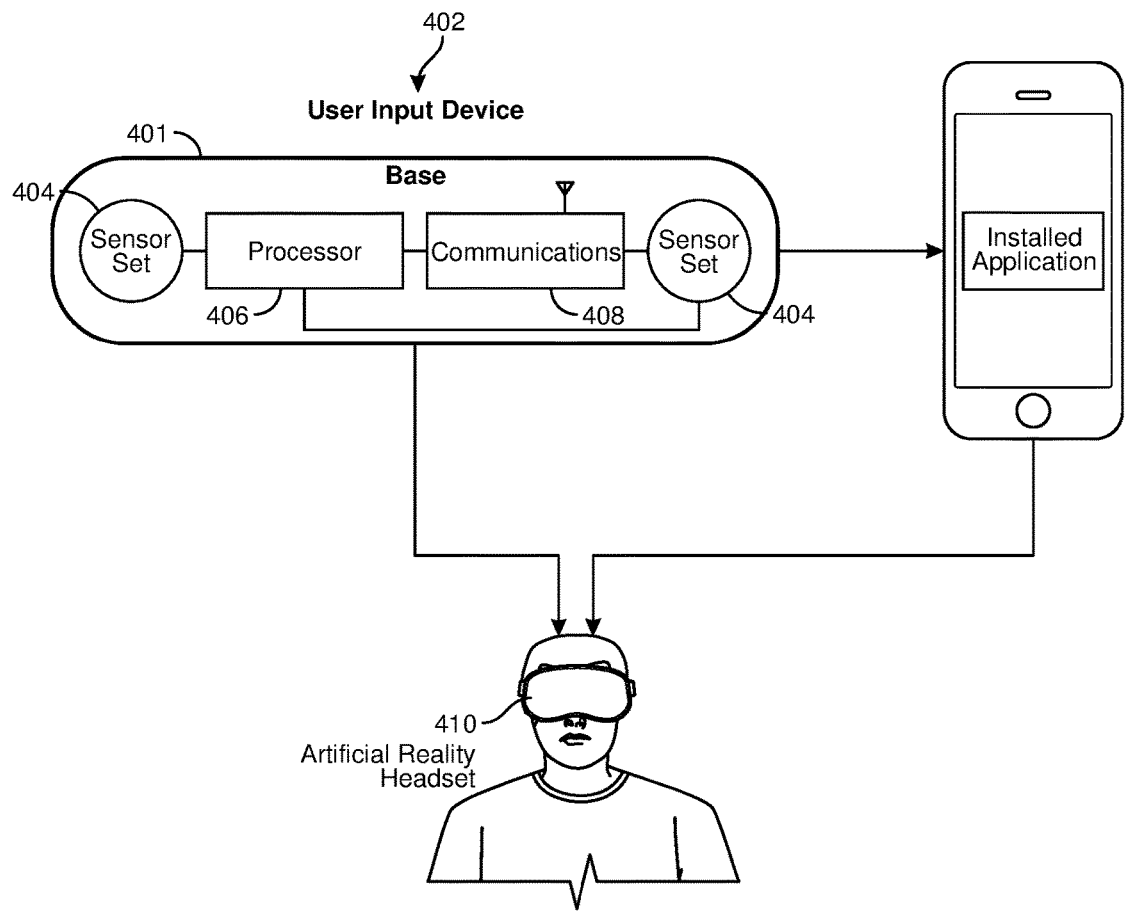
FIG. 4B is a diagram of an exemplary environment in which embodiments of the user interface system described herein may be implemented.

As an example, FIG. 4B is an illustration of how the wearable device may be used to communicate with other devices such that the other devices can be used to perform aspects of the signal processing or logic involved. As shown, input device 402 may include one or more sensors in a sensor set 404 mounted on or attached to a base 401. Sensor set 404 may generally represent one or more sensors or transducers, such as a microphone, accelerometer, or other type of acoustic or surface vibration sensor or transducer. There may be more than one sensor set on device 402. Input device 402 may also include an electronic processor or controller 406. Processor or controller 406 may be programmed with a set of computer-executable instructions (stored in an electronic data storage element) that, when executed, perform one or more of wave detection, signal processing and/or decision logic operations. Processor 406 may be coupled to communications element 408, where element 408 is capable of wirelessly communicating with a second device, such as an artificial reality headset 410. This combination of functions or elements may enable one embodiment of input device 402 to detect audio and surface vibrational waves using an appropriate sensor, perform processing on the signals generated by the sensors, make one or more decisions based on the processed signals, and then communicate the result of those decisions to a second device (in this example, an artificial reality headset).

In some examples, the second device may be a mobile phone 412, in which is installed an application 414. Application 414 may be used to perform some (or in some cases, all) of the signal processing or decision operations instead of (or in addition to) those being performed by device 402. In such a situation, application 414 may cause mobile phone 412 to transmit the results of those signal processing and/or decision operations to headset 410.

The embodiments described herein are directed to a user input device and system that may overcome the disadvantages of conventional controller-based user input devices, particularly for users engaged in experiencing an artificial-reality environment. An example of the user input system may include a wearable device having a set of sensors positioned to detect a user's contact with a surface, an electronic data storage element containing a set of computer-executable instructions, and an electronic processor programmed with the set of computer-executable instructions. When executed, the set of instructions may cause the system to detect a vibration propagating through a first medium as a result of the user's contact with the surface, detect a vibration propagating through a second medium as a result of the user's contact with the surface, and determine a location where the user contacted the surface based on a time difference between detecting the vibration propagating through the first medium and detecting the vibration propagating through the second medium. The determined location may then be used by another device, such as an artificial reality headset, to alter the environment being experienced by the user.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 500 in FIG. 5) or that visually immerses a user in an artificial reality (such as, e.g., virtual-reality system 600 in FIG. 6). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 5:
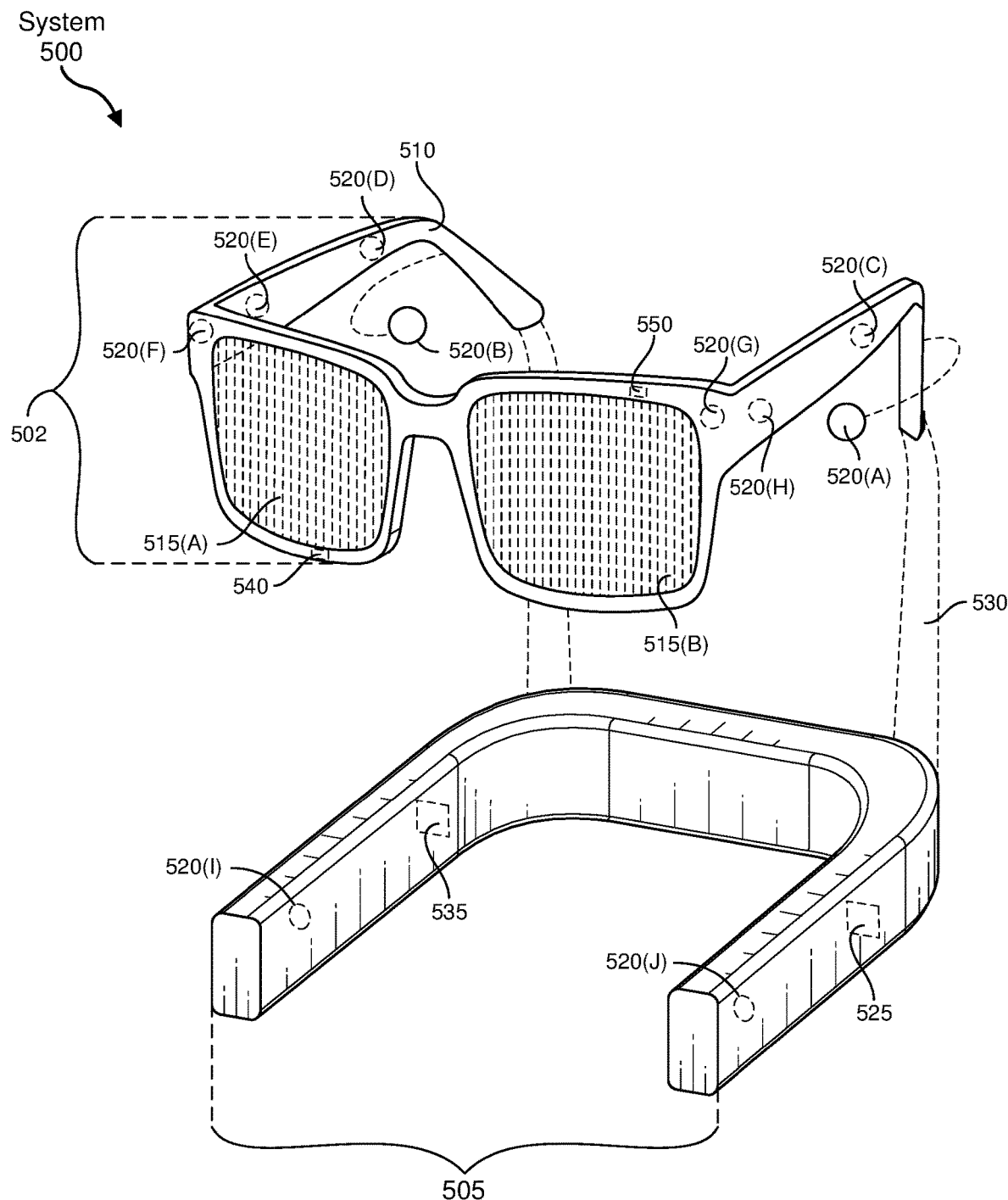
FIG. 5 is an illustration of exemplary augmented-reality glasses that may be used in connection with embodiments of this disclosure.

Turning to FIG. 5, augmented-reality system 500 may include an eyewear device 502 with a frame 510 configured to hold a left display device 515(A) and a right display device 515(B) in front of a user's eyes. Display devices 515(A) and 515(B) may act together or independently to present an image or series of images to a user. While augmented-reality system 500 includes two displays, embodiments of this disclosure may be implemented in augmented-reality systems with a single NED or more than two NEDs.

In some embodiments, augmented-reality system 500 may include one or more sensors, such as sensor 540. Sensor 540 may generate measurement signals in response to motion of augmented-reality system 500 and may be located on substantially any portion of frame 510. Sensor 540 may represent one or more of a variety of different sensing mechanisms, such as a position sensor, an inertial measurement unit (IMU), a depth camera assembly, a structured light emitter and/or detector, or any combination thereof. In some embodiments, augmented-reality system 500 may or may not include sensor 540 or may include more than one sensor. In embodiments in which sensor 540 includes an IMU, the IMU may generate calibration data based on measurement signals from sensor 540. Examples of sensor 540 may include, without limitation, accelerometers, gyroscopes, magnetometers, other suitable types of sensors that detect motion, sensors used for error correction of the IMU, or some combination thereof.

In some examples, augmented-reality system 500 may also include a microphone array with a plurality of acoustic transducers 520(A)-520(J), referred to collectively as acoustic transducers 520. Acoustic transducers 520 may represent transducers that detect air pressure variations induced by sound waves. Each acoustic transducer 520 may be configured to detect sound and convert the detected sound into an electronic format (e.g., an analog or digital format). The microphone array in FIG. 6 may include, for example, ten acoustic transducers: 520(A) and 520(B), which may be designed to be placed inside a corresponding ear of the user, acoustic transducers 520(C), 520(D), 520(E), 520(F), 520 (G), and 520(H), which may be positioned at various locations on frame 510, and/or acoustic transducers 520(I) and 520(J), which may be positioned on a corresponding neckband 505.

In some embodiments, one or more of acoustic transducers 520(A)-(F) may be used as output transducers (e.g., speakers). For example, acoustic transducers 520(A) and/or 520(B) may be earbuds or any other suitable type of headphone or speaker.

The configuration of acoustic transducers 520 of the microphone array may vary. While augmented-reality system 500 is shown in FIG. 5 as having ten acoustic transducers 520, the number of acoustic transducers 520 may be greater or less than ten. In some embodiments, using higher numbers of acoustic transducers 520 may increase the amount of audio information collected and/or the sensitivity and accuracy of the audio information. In contrast, using a lower number of acoustic transducers 520 may decrease the computing power required by an associated controller 550 to process the collected audio information. In addition, the position of each acoustic transducer 520 of the microphone array may vary. For example, the position of an acoustic transducer 520 may include a defined position on the user, a defined coordinate on frame 510, an orientation associated with each acoustic transducer 520, or some combination thereof.

Acoustic transducers 520(A) and 520(B) may be positioned on different parts of the user's ear, such as behind the pinna, behind the tragus, and/or within the auricle or fossa. Or, there may be additional acoustic transducers 520 on or surrounding the ear in addition to acoustic transducers 520 inside the ear canal. Having an acoustic transducer 520 positioned next to an ear canal of a user may enable the microphone array to collect information on how sounds arrive at the ear canal. By positioning at least two of acoustic transducers 520 on either side of a user's head (e.g., as binaural microphones), augmented-reality device 500 may simulate binaural hearing and capture a 3D stereo sound field around about a user's head. In some embodiments, acoustic transducers 520(A) and 520(B) may be connected to augmented-reality system 500 via a wired connection 530, and in other embodiments acoustic transducers 520(A) and 520(B) may be connected to augmented-reality system 500 via a wireless connection (e.g., a Bluetooth connection). In still other embodiments, acoustic transducers 520(A) and 520(B) may not be used at all in conjunction with augmented-reality system 500.

Acoustic transducers 520 on frame 510 may be positioned in a variety of different ways, including along the length of the temples, across the bridge, above or below display devices 515(A) and 515(B), or some combination thereof. Acoustic transducers 520 may also be oriented such that the microphone array is able to detect sounds in a wide range of directions surrounding the user wearing the augmented-reality system 500. In some embodiments, an optimization process may be performed during manufacturing of augmented-reality system 500 to determine relative positioning of each acoustic transducer 520 in the microphone array.

In some examples, augmented-reality system 500 may include or be connected to an external device (e.g., a paired device), such as neckband 505. Neckband 505 generally represents any type or form of paired device. Thus, the following discussion of neckband 505 may also apply to various other paired devices, such as charging cases, smart watches, smart phones, wrist bands, other wearable devices, hand-held controllers, tablet computers, laptop computers, other external compute devices, etc.

As shown, neckband 505 may be coupled to eyewear device 502 via one or more connectors. The connectors may be wired or wireless and may include electrical and/or non-electrical (e.g., structural) components. In some cases, eyewear device 502 and neckband 505 may operate independently without any wired or wireless connection between them. While FIG. 5 illustrates the components of eyewear device 502 and neckband 505 in example locations on eyewear device 502 and neckband 505, the components may be located elsewhere and/or distributed differently on eyewear device 502 and/or neckband 505. In some embodiments, the components of eyewear device 502 and neckband 505 may be located on one or more additional peripheral devices paired with eyewear device 502, neckband 505, or some combination thereof.

Pairing external devices, such as neckband 505, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 500 may be provided by a paired device or shared between a paired device and an eyewear device, thus reducing the weight, heat profile, and form factor of the eyewear device overall while still retaining desired functionality. For example, neckband 505 may allow components that would otherwise be included on an eyewear device to be included in neckband 505 since users may tolerate a heavier weight load on their shoulders than they would tolerate on their heads. Neckband 505 may also have a larger surface area over which to diffuse and disperse heat to the ambient environment. Thus, neckband 505 may allow for greater battery and computation capacity than might otherwise have been possible on a stand-alone eyewear device. Since weight carried in neckband 505 may be less invasive to a user than weight carried in eyewear device 502, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

Neckband 505 may be communicatively coupled with eyewear device 502 and/or to other devices. These other devices may provide certain functions (e.g., tracking, localizing, depth mapping, processing, storage, etc.) to augmented-reality system 500. In the embodiment of FIG. 5, neckband 505 may include two acoustic transducers (e.g., 520(I) and 520(J)) that are part of the microphone array (or potentially form their own microphone subarray). Neckband 505 may also include a controller 525 and a power source 535.

Acoustic transducers 520(I) and 520(J) of neckband 505 may be configured to detect sound and convert the detected sound into an electronic format (analog or digital). In the embodiment of FIG. 5, acoustic transducers 520(I) and 520(J) may be positioned on neckband 505, thereby increasing the distance between the neckband acoustic transducers 520(I) and 520(J) and other acoustic transducers 520 positioned on eyewear device 502. In some cases, increasing the distance between acoustic transducers 520 of the microphone array may improve the accuracy of beamforming performed via the microphone array. For example, if a sound is detected by acoustic transducers 520(C) and 520(D) and the distance between acoustic transducers 520(C) and 520(D) is greater than, e.g., the distance between acoustic transducers 520(D) and 520(E), the determined source location of the detected sound may be more accurate than if the sound had been detected by acoustic transducers 520(D) and 520(E).

Controller 525 of neckband 505 may process information generated by the sensors on neckband 505 and/or augmented-reality system 500. For example, controller 525 may process information from the microphone array that describes sounds detected by the microphone array. For each detected sound, controller 525 may perform a direction-of-arrival (DOA) estimation to estimate a direction from which the detected sound arrived at the microphone array. As the microphone array detects sounds, controller 525 may populate an audio data set with the information. In embodiments in which augmented-reality system 500 includes an inertial measurement unit, controller 525 may compute all inertial and spatial calculations from the IMU located on eyewear device 502. A connector may convey information between augmented-reality system 500 and neckband 505 and between augmented-reality system 500 and controller 525. The information may be in the form of optical data, electrical data, wireless data, or any other transmittable data form. Moving the processing of information generated by augmented-reality system 500 to neckband 505 may reduce weight and heat in eyewear device 502, making it more comfortable to the user.

Power source 535 in neckband 505 may provide power to eyewear device 502 and/or to neckband 505. Power source 535 may include, without limitation, lithium ion batteries, lithium-polymer batteries, primary lithium batteries, alkaline batteries, or any other form of power storage. In some cases, power source 535 may be a wired power source. Including power source 535 on neckband 505 instead of on eyewear device 502 may help better distribute the weight and heat generated by power source 535.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 600 in FIG. 6, that mostly or completely covers a user's field of view. Virtual-reality system 600 may include a front rigid body 602 and a band 604 shaped to fit around a user's head. Virtual-reality system 600 may also include output audio transducers 606(A) and 606(B). Furthermore, while not shown in FIG. 6, front rigid body 602 may include one or more electronic elements, including one or more electronic displays, one or more inertial measurement units (IMUS), one or more tracking emitters or detectors, and/or any other suitable device or system for creating an artificial-reality experience.

Artificial-reality systems may include a variety of types of visual feedback mechanisms. For example, display devices in augmented-reality system 500 and/or virtual-reality system 600 may include one or more liquid crystal displays (LCDs), light emitting diode (LED) displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some the artificial-reality systems described herein may include one or more projection systems. For example, display devices in augmented-reality system 500 and/or virtual-reality system 600 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 500 and/or virtual-reality system 600 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

As noted, artificial-reality systems 500 and 600 may be used with a variety of other types of devices to provide a more compelling artificial-reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 7:
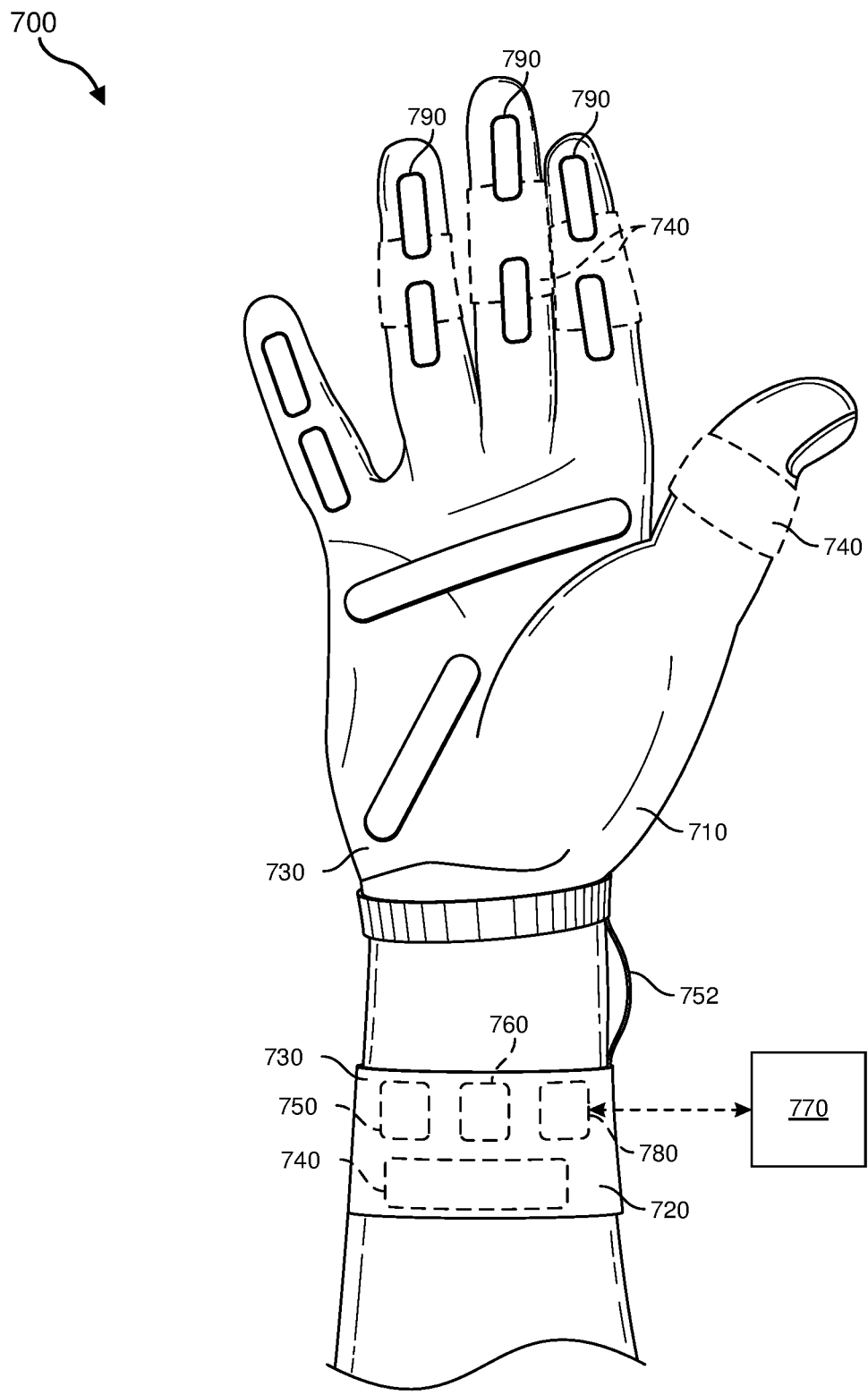
FIG. 7 is an illustration of exemplary haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 7 illustrates a vibrotactile system 700 in the form of a wearable glove (haptic device 710) and wristband (haptic device 720). Haptic device 710 and haptic device 720 are shown as examples of wearable devices that include a flexible, wearable textile material 730 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

One or more vibrotactile devices 740 may be positioned at least partially within one or more corresponding pockets formed in textile material 730 of vibrotactile system 700. Vibrotactile devices 740 may be positioned in locations to provide a vibrating sensation (e.g., haptic feedback) to a user of vibrotactile system 700. For example, vibrotactile devices 740 may be positioned against the user's finger(s), thumb, or wrist, as shown in FIG. 7. Vibrotactile devices 740 may, in some examples, be sufficiently flexible to conform to or bend with the user's corresponding body part(s).

A power source 750 (e.g., a battery) for applying a voltage to the vibrotactile devices 740 for activation thereof may be electrically coupled to vibrotactile devices 740, such as via conductive wiring 752. In some examples, each of vibrotactile devices 740 may be independently electrically coupled to power source 750 for individual activation. In some embodiments, a processor 760 may be operatively coupled to power source 750 and configured (e.g., programmed) to control activation of vibrotactile devices 740.

Vibrotactile system 700 may be implemented in a variety of ways. In some examples, vibrotactile system 700 may be a standalone system with integral subsystems and components for operation independent of other devices and systems. As another example, vibrotactile system 700 may be configured for interaction with another device or system 770. For example, vibrotactile system 700 may, in some examples, include a communications interface 780 for receiving and/or sending signals to the other device or system 770. The other device or system 770 may be a mobile device, a gaming console, an artificial-reality (e.g., virtual-reality, augmented-reality, mixed-reality) device, a personal computer, a tablet computer, a network device (e.g., a modem, a router, etc.), a handheld controller, etc. Communications interface 780 may enable communications between vibrotactile system 700 and the other device or system 770 via a wireless (e.g., Wi-Fi, Bluetooth, cellular, radio, etc.) link or a wired link. If present, communications interface 780 may be in communication with processor 760, such as to provide a signal to processor 760 to activate or deactivate one or more of the vibrotactile devices 740.

Vibrotactile system 700 may optionally include other subsystems and components, such as touch-sensitive pads 790, pressure sensors, motion sensors, position sensors, lighting elements, and/or user interface elements (e.g., an on/off button, a vibration control element, etc.). During use, vibrotactile devices 740 may be configured to be activated for a variety of different reasons, such as in response to the user's interaction with user interface elements, a signal from the motion or position sensors, a signal from the touch-sensitive pads 790, a signal from the pressure sensors, a signal from the other device or system 770, etc.

Although power source 750, processor 760, and communications interface 780 are illustrated in FIG. 7 as being positioned in haptic device 720, the present disclosure is not so limited. For example, one or more of power source 750, processor 760, or communications interface 780 may be positioned within haptic device 710 or within another wearable textile.

Figure 8:
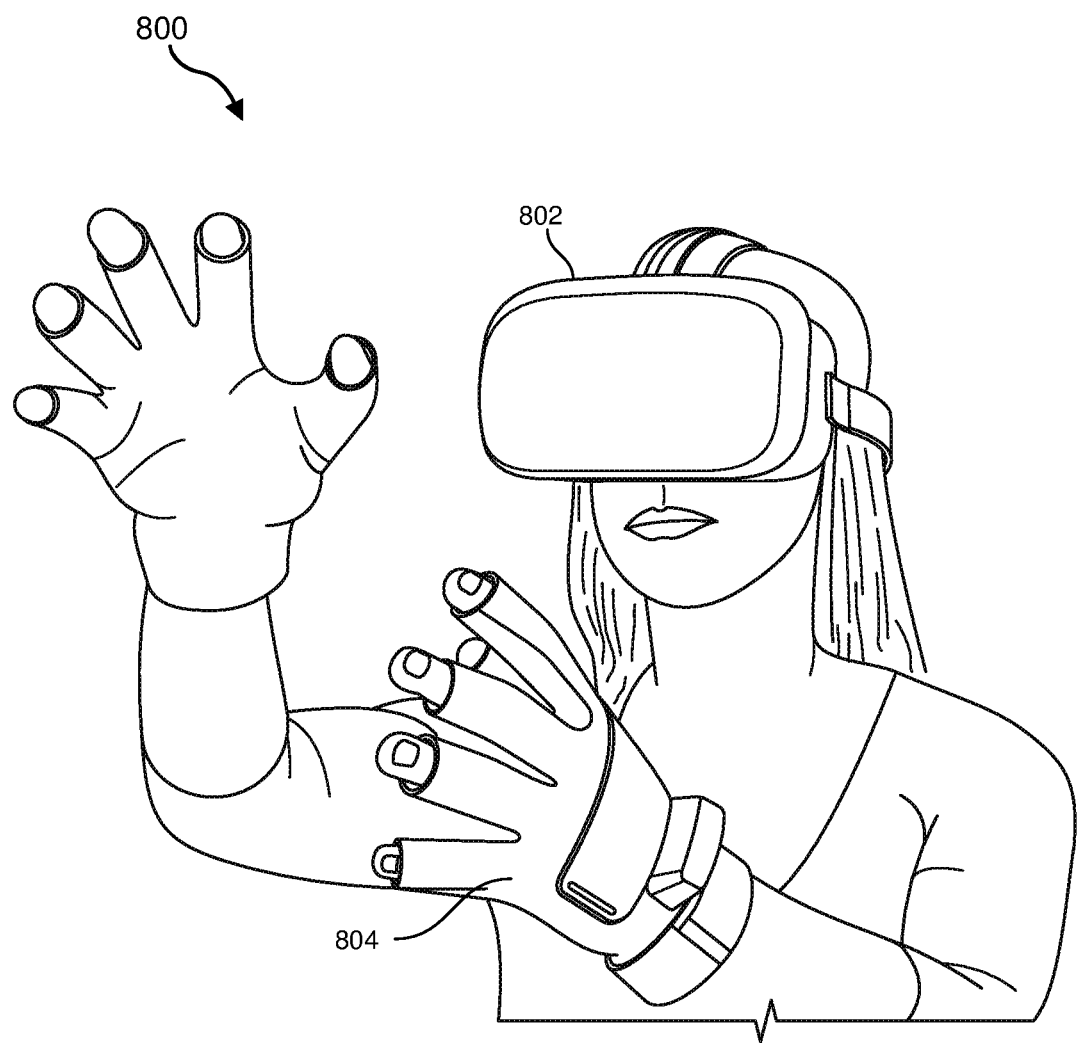
FIG. 8 is an illustration of an exemplary virtual-reality environment according to embodiments of this disclosure.

Haptic wearables, such as those shown in and described in connection with FIG. 7, may be implemented in a variety of types of artificial-reality systems and environments. FIG. 8 shows an example artificial-reality environment 800 including one head-mounted virtual-reality display and two haptic devices (i.e., gloves), and in other embodiments any number and/or combination of these components and other components may be included in an artificial-reality system. For example, in some embodiments there may be multiple head-mounted displays each having an associated haptic device, with each head-mounted display and each haptic device communicating with the same console, portable computing device, or other computing system.

Figure 6:
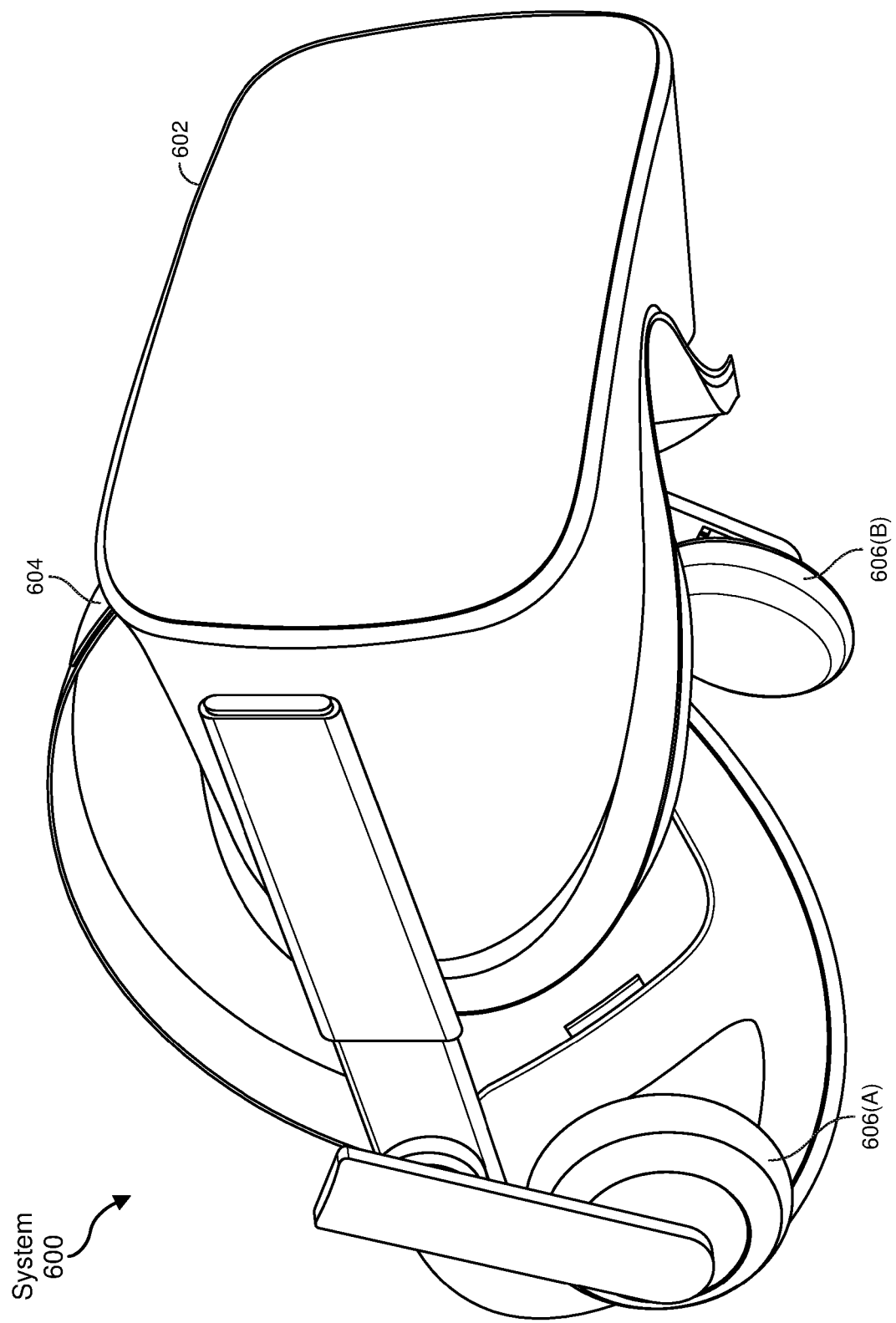
FIG. 6 is an illustration of an exemplary virtual-reality headset that may be used in connection with embodiments of this disclosure.

Head-mounted display 802 generally represents any type or form of virtual-reality system, such as virtual-reality system 600 in FIG. 6. Haptic device 804 generally represents any type or form of wearable device, worn by a user of an artificial-reality system, that provides haptic feedback to the user to give the user the perception that he or she is physically engaging with a virtual object. In some embodiments, haptic device 804 may provide haptic feedback by applying vibration, motion, and/or force to the user. For example, haptic device 804 may limit or augment a user's movement. To give a specific example, haptic device 804 may limit a user's hand from moving forward so that the user has the perception that his or her hand has come in physical contact with a virtual wall. In this specific example, one or more actuators within the haptic device may achieve the physical-movement restriction by pumping fluid into an inflatable bladder of the haptic device. In some examples, a user may also use haptic device 804 to send action requests to a console. Examples of action requests include, without limitation, requests to start an application and/or end the application and/or requests to perform a particular action within the application.

Figure 9:
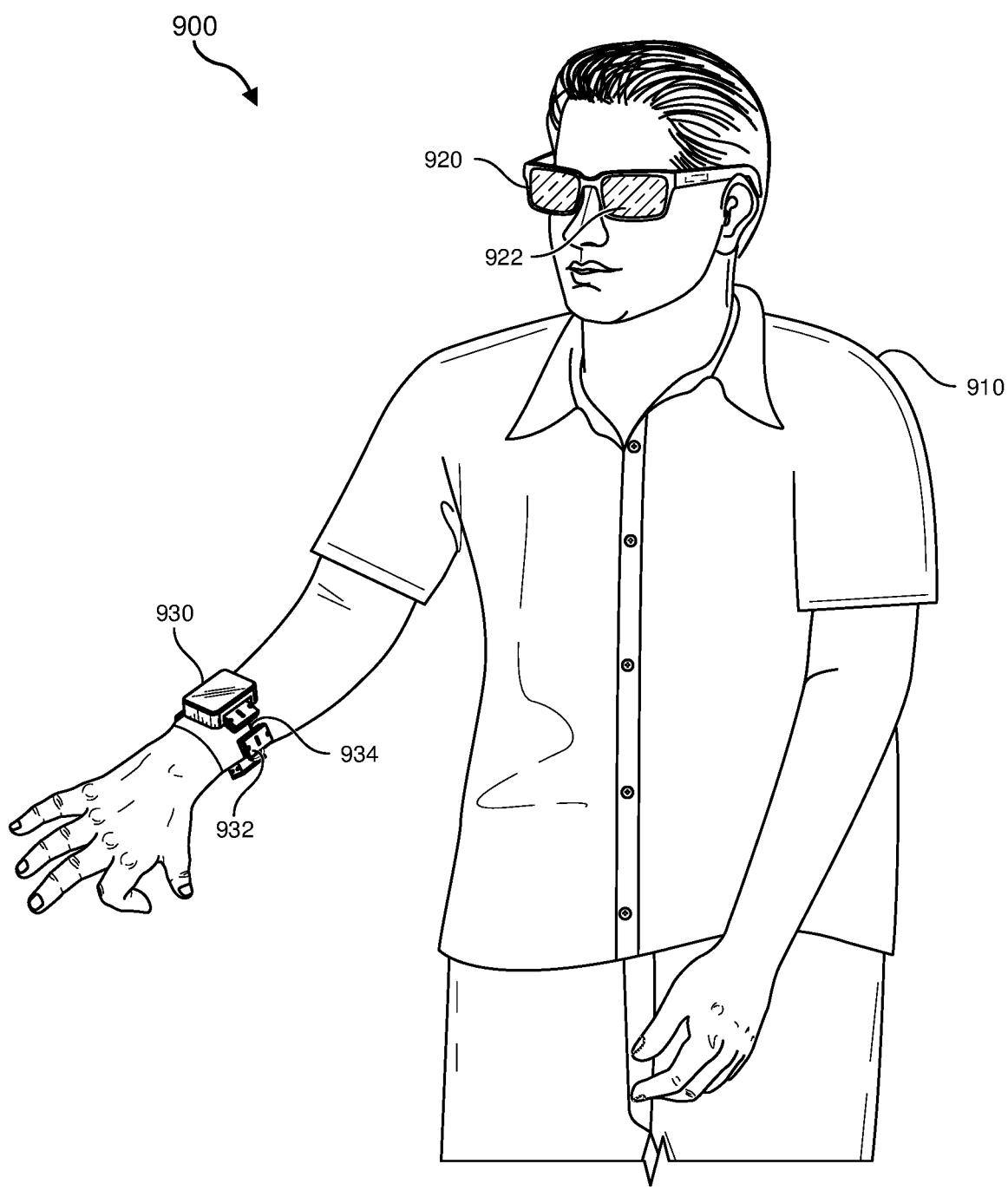
FIG. 9 is an illustration of an exemplary augmented-reality environment according to embodiments of this disclosure.

While haptic interfaces may be used with virtual-reality systems, as shown in FIG. 8, haptic interfaces may also be used with augmented-reality systems, as shown in FIG. 9. FIG. 9 is a perspective view of a user 910 interacting with an augmented-reality system 900. In this example, user 910 may wear a pair of augmented-reality glasses 920 that may have one or more displays 922 and that are paired with a haptic device 930. In this example, haptic device 930 may be a wristband that includes a plurality of band elements 932 and a tensioning mechanism 934 that connects band elements 932 to one another.

One or more of band elements 932 may include any type or form of actuator suitable for providing haptic feedback. For example, one or more of band elements 932 may be configured to provide one or more of various types of cutaneous feedback, including vibration, force, traction, texture, and/or temperature. To provide such feedback, band elements 932 may include one or more of various types of actuators. In one example, each of band elements 932 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 710, 720, 804, and 930 may include any suitable number and/or type of haptic transducer, sensor, and/or feedback mechanism. For example, haptic devices 710, 720, 804, and 930 may include one or more mechanical transducers, piezoelectric transducers, and/or fluidic transducers. Haptic devices 710, 720, 804, and 930 may also include various combinations of different types and forms of transducers that work together or independently to enhance a user's artificial-reality experience. In one example, each of band elements 932 of haptic device 930 may include a vibrotactor (e.g., a vibrotactile actuator) configured to vibrate in unison or independently to provide one or more of various types of haptic sensations to a user.

In some versions, different user gestures may be able to be discriminated and in response, reacted to by an artificial reality system in a way dependent upon the gesture.

The present disclosure is generally directed to devices and methods for enabling any suitable surface (e.g., a table, clothing, an object, etc.) to function as an input device/surface for an artificial reality application. Embodiments operate to reliably detect if a user is engaging in a contact action and in some embodiments to also reliably determine where the user is contacting an un-instrumented surface when the user's hand is resting on the surface. In some embodiments, this is accomplished using a device equipped with specific sensors and data processing capabilities.

EXAMPLE EMBODIMENTS

Example 1: A wearable device may include a set of sensors positioned to detect a user's contact with a surface, an electronic data storage element containing a set of computer-executable instructions, an electronic processor coupled to the electronic data storage element and configured to execute the set of instructions to cause the system to detect a vibration propagating through a first medium as a result of the user's contact with the surface, detect a vibration propagating through a second medium as a result of the user's contact with the surface, and determine a location where the user contacted the surface based on a time difference between detecting the vibration propagating through the first medium and detecting the vibration propagating through the second medium.

Example 2: The wearable device of Example 1, wherein the first medium comprises air and the second medium comprises the surface.

Example 3: The wearable device of Example 1, wherein the set of sensors includes a first transducer for detecting the vibration propagating through the air and a second transducer for detecting the vibration propagating through the surface.

Example 4: The wearable device of Example 3, wherein the first transducer is an audio transducer and the second transducer is an accelerometer.

Example 5: The wearable device of Example 1, further including an optical sensor, the output of the optical sensor being used in determining the location of where the user contacted the surface.

Example 6: The wearable device of Example 1, further including a transmitting element operable to transmit one or more of data obtained from the set of sensors or data regarding the determined location to another device that uses the transmitted data to determine a desired action of the user.

Example 7: The wearable device of Example 6, wherein the other device to which the transmitting element transmits the data is an artificial reality headset.

Example 8: The wearable device of Example 7, wherein the determined location is used by the headset to alter the experience of the user wearing the headset.

Example 9: The wearable device of Example 1, wherein the set of sensors includes a pair of microphones and a pair of accelerometers, and the set of sensors are arranged on the wearable device with each of the accelerometers and each of the microphones placed at the corners of a square.

Example 10: The wearable device of Example 9, wherein the wearable device is a wristband or bracelet and the set of sensors are positioned with a first accelerometer in the lower left corner of the square, a second accelerometer in the upper left corner of the square, a first microphone in the lower right corner of the square, and a second microphone in the upper right corner of the square, and the axis between the two accelerometers or two microphones is defined as the x-axis relative to a user's wrist deviation and the axis between a microphone and an accelerometer is defined as the orthogonal y-axis relative to the user's wrist flexion and extension.

Example 11: A system including a headset operable to generate an artificial reality experience for a user, a wearable device having a set of sensors positioned to detect a user's contact with a surface, an electronic data storage element containing a set of computer-executable instructions, an electronic processor coupled to the electronic data storage element and configured to execute the set of instructions to cause the system to detect a vibration propagating through a first medium as a result of the user's contact with the surface, detect a vibration propagating through a second medium as a result of the user's contact with the surface, and determine a location where the user contacted the surface based on a time difference between detecting the vibration propagating through the first medium and detecting the vibration propagating through the second medium, and a transmitting element operable to transmit one or more of data obtained from the set of sensors or data regarding the determined location to the headset.

Example 12: The system of Example 11, wherein the first medium comprises air and the second medium comprises the surface.

Example 13: The system of Example 12, wherein the set of sensors includes a first transducer for detecting the vibration propagating through the air and a second transducer for detecting the vibration propagating through the surface.

Example 14: The system of Example 13, wherein the first transducer is an audio transducer and the second transducer is an accelerometer.

Example 15: The system of Example 11, further including an optical sensor, the output of the optical sensor being used in determining the location of where the user contacted the surface.

Example 16: The system of Example 11, wherein the determined location is used by the headset to alter the experience of a user wearing the headset.

Example 17: The system of Example 11, wherein the wearable device is a wristband or bracelet and the set of sensors are positioned with a first accelerometer in the lower left corner of a square, a second accelerometer in the upper left corner of a square, a first microphone in the lower right corner of a square, and a second microphone in the upper right corner of a square, where the axis between the two accelerometers or two microphones is defined as the x-axis relative to a user's wrist deviation and the axis between a microphone and an accelerometer is defined as the orthogonal y-axis relative to the user's wrist flexion and extension.

Example 18: A method including detecting a vibration propagating through a first medium as a result of a user's contact with a surface, detecting a vibration propagating through a second medium as a result of the user's contact with the surface, determining a location where the user contacted the surface based on a time difference between detecting the vibration propagating through the first medium and detecting the vibration propagating through the second medium and using the determined location to determine the user's intended interaction with a user interface.

Example 19: The method of claim 18, further comprising transmitting data regarding the determined location to a headset operable to generate an artificial reality experience for the user.

Example 20: The method of claim 18, wherein the first medium is air and the second medium is the surface.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive [data] to be transformed, transform the [data], output a result of the transformation to [perform a function], use the result of the transformation to [perform a function], and store the result of the transformation to [perform a function]. Additionally, or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to any claims appended hereto and their equivalents in determining the scope of the present disclosure.

Unless otherwise noted, the terms "connected to" and "coupled to" (and their derivatives), as used in the specification and/or claims, are to be construed as permitting both direct and indirect (i.e., via other elements or components) connection. In addition, the terms "a" or "an," as used in the specification and/or claims, are to be construed as meaning "at least one of." Finally, for ease of use, the terms "including" and "having" (and their derivatives), as used in the specification and/or claims, are interchangeable with and have the same meaning as the word "comprising."

What is claimed is:

1. A wearable device, comprising:
a wristband having a bottom side configured to be worn proximate to an inner portion of a user's wrist;
two or more vibration sensors coupled to the bottom side of the wristband and positioned to detect when the user's fingers contact a surface, the wearable device being separate and distinct from the surface;
an electronic data storage element containing a set of computer-executable instructions; and
an electronic processor coupled to the electronic data storage element and configured to execute the set of instructions to cause the wearable device to use the two or more vibration sensors coupled to the bottom side of the wristband to:
detect a vibration propagating through a first medium as a result of a contact of a finger of the user with the surface;
detect a vibration propagating through a second medium as a result of the contact of the finger of the user with the surface; and
determine a location where the finger of the user contacted the surface based on a time difference between detecting the vibration propagating through the first medium and detecting the vibration propagating through the second medium.

2. The wearable device of claim 1, wherein the first medium comprises air and the second medium comprises the surface.

3. The wearable device of claim 2, wherein the two or more vibration sensors include a first transducer for detecting the vibration propagating through the air and a second transducer for detecting the vibration propagating through the surface.

4. The wearable device of claim 3, wherein the first transducer is an audio transducer and the second transducer is an accelerometer.

5. The wearable device of claim 1, further comprising an optical sensor coupled to the bottom side of the wristband, an output of the optical sensor being used in determining the location of where the user contacted the surface.

6. The wearable device of claim 1, further comprising a transmitting element operable to transmit one or more of data obtained from the two or more vibration sensors or data regarding the determined location to another device that uses the transmitted data to determine a desired action of the user.

7. The wearable device of claim 6, wherein the other device to which the transmitting element transmits the data is an artificial reality headset.

8. The wearable device of claim 7, wherein the determined location is used by the headset to alter an experience of the user wearing the headset.

9. The wearable device of claim 1, wherein:
the two or more vibration sensors include a pair of microphones and a pair of accelerometers; and
the two or more vibration sensors are arranged on the wearable device with each of the accelerometers and each of the microphones placed at the corners of a square.

10. The wearable device of claim 9, wherein:
the two or more vibration sensors are positioned with a first accelerometer in the lower left corner of the square, a second accelerometer in the upper left corner of the square, a first microphone in the lower right corner of the square, and a second microphone in the upper right corner of the square;
the axis between the two accelerometers or two microphones is defined as the x-axis relative to a user's wrist deviation; and
the axis between a microphone and an accelerometer is defined as the orthogonal y-axis relative to the user's wrist flexion and extension.

11. A system, comprising:
a headset operable to generate an artificial reality experience for a user;
a wearable device comprising:
a wristband having a bottom side configured to be worn proximate to an inner portion of a wrist of the user; and
two or more vibration sensors coupled to the bottom side of the wristband and positioned to detect when the user's fingers contact a surface, the wearable device being separate and distinct from the surface;
an electronic data storage element containing a set of computer-executable instructions;
an electronic processor coupled to the electronic data storage element and configured to execute the set of instructions to cause the system to use the two or more vibration sensors coupled to the bottom side of the wristband to:
detect a vibration propagating through a first medium as a result of a contact of a finger of the user with the surface;
detect a vibration propagating through a second medium as a result of the contact of the finger of the user with the surface; and
determine a location where the finger of the user contacted the surface based on a time difference between detecting the vibration propagating through the first medium and detecting the vibration propagating through the second medium; and
a transmitting element operable to transmit one or more of data obtained from the two or more vibration sensors or data regarding the determined location to the headset.

12. The system of claim 11, wherein the first medium comprises air and the second medium comprises the surface.

13. The system of claim 12, wherein the two or more vibration sensors include a first transducer for detecting the vibration propagating through the air and a second transducer for detecting the vibration propagating through the surface.

14. The system of claim 13, wherein the first transducer is an audio transducer and the second transducer is an accelerometer.

15. The system of claim 11, further comprising an optical sensor coupled to the bottom side of the wristband, an output of the optical sensor being used in determining the location of where the user contacted the surface.

16. The system of claim 11, wherein the determined location is used by the headset to alter the experience of a user wearing the headset.

17. The system of claim 11, wherein:
- the two or more vibration sensors are positioned with a first accelerometer in the lower left corner of a square, a second accelerometer in the upper left corner of a square, a first microphone in the lower right corner of a square, and a second microphone in the upper right corner of a square;
- the axis between the two accelerometers or two microphones is defined as the x-axis relative to a user's wrist deviation; and
- the axis between a microphone and an accelerometer is defined as the orthogonal y-axis relative to the user's wrist flexion and extension.

18. A method, comprising:
using two or more vibration sensors coupled to a bottom side of a wristband to detect when a user's fingers contact a surface that is separate and distinct from the wristband by:
- detecting a vibration propagating through a first medium as a result of a contact of a finger of the user with the surface;
- detecting a vibration propagating through a second medium as a result of the contact of the finger of the user with the surface; and
- determining a location where the finger of the user contacted the surface based on a time difference between detecting the vibration propagating through the first medium and detecting the vibration propagating through the second medium; and using the determined location to determine the user's intended interaction with a user interface.

19. The method of claim 18, further comprising:
transmitting data regarding the determined location to a headset operable to generate an artificial reality experience for the user.

20. The method of claim 18, wherein the first medium is air and the second medium is the surface.

* * * * *